United States Patent [19]

McCollum et al.

[11] Patent Number: 4,665,355

[45] Date of Patent: May 12, 1987

[54] OFF LINE CAPACITOR-DIVIDER POWER SUPPLY FOR SOLID STATE POWER CONTROLLER

[75] Inventors: Patrick E. McCollum; Mark E. Colan, both of Yorba Linda, Calif.

[73] Assignee: Rockwell International Corporation, El Segundo, Calif.

[21] Appl. No.: 907,437

[22] Filed: Sep. 15, 1986

[51] Int. Cl.⁴ .................................................. G05F 3/18
[52] U.S. Cl. ..................................... 323/237; 323/231; 323/320
[58] Field of Search ......................... 323/267, 237–246, 323/320–327, 231; 363/61, 62

[56] References Cited

U.S. PATENT DOCUMENTS

| | | | |
|---|---|---|---|
| 4,359,681 | 11/1982 | Baker et al. | 323/237 |
| 4,567,425 | 1/1986 | Bloomer | 323/237 |

FOREIGN PATENT DOCUMENTS

| | | | |
|---|---|---|---|
| 1806352 | 5/1970 | Fed. Rep. of Germany | 323/231 |
| 2645569 | 4/1977 | Fed. Rep. of Germany | 363/62 |
| 155419 | 12/1981 | Japan | 323/324 |
| 182724 | 10/1983 | Japan | 323/324 |

OTHER PUBLICATIONS

Radcliffe, "Solar Heating System Controller", IBM Tech. Discl. Bul., vol. 20, No. 11b, pp. 4742, 3, Apr. 1978.

Primary Examiner—William H. Beha, Jr.
Attorney, Agent, or Firm—H. Fredrick Hamann; George A. Montanye; James F. Kirk

[57] ABSTRACT

A solid state power controller off-line capacitor divider power supply coupler between an ac voltage source output terminal and neutral terminal, supplying regulated dc voltage levels referenced to the ac voltage source output terminal to a load such as the control and drive circuits of a solid state power controller. The invention circuit comprises an input capacitor having a first and second terminal. The capacitor first terminal is coupled to the ac voltage source neutral terminal. A first diode has an anode and a cathode; the anode is coupled to the capacitor second terminal. A positive filter capacitor has a first and second terminal. The first terminal being coupled to the first diode cathode and the filter capacitor second terminal being coupled to the control and drive circuit reference terminal. The invention circuit has a first positive regulator means with an input terminal, an output terminal and a reference terminal. The input terminal is coupled to the filter capacitor first terminal. The reference terminal is coupled to the control and drive circuit reference terminal. A second diode has an anode and a cathode. Its output is coupled to the control and drive circuit reference terminal and the second diode cathode is coupled to the input capacitor second terminal.

4 Claims, 6 Drawing Figures 4,665,355

OFF LINE CAPACITOR-DIVIDER POWER SUPPLY FOR SOLID STATE POWER CONTROLLER

BACKGROUND OF THE INVENTION

1. Field of the Invention

This invention relates to the field of electrical switches and particularly to the field of remotely controlled electrical switches capable of interrupting the application of a source voltage to a load in response to an overload condition.

This invention relates more particularly to the field of SSPC (solid state power controllers) for ac (alternating current) service or solid state electrical switches such as solid state relays for use in aircraft applications capable of detecting overload conditions, such as those caused by battle damage. Solid state power controller ac switches are able to interrupt electrical service to the load automatically thereby preventing or limiting further damage to the service or load or lead wire. This invention off-line capacitor divider supply circuit has the capability of supplying several voltage levels to the control and drive circuitry used within SSPCs. The invention circuit is line powered and referenced to the line voltage level, a fact that permits it to provide the required dc levels to circuitry also referenced to the line voltage level, i.e. typically 230 V ac, 400 Hz. The circuit provides a light weight, noise free, low cost solution having low power dissipation, immunity to high vibration, mechanical shock and high reliability.

2. Description of the Prior Art

Electromechanical switching devices using solenoid driven means to transfer electromechanical contacts to apply a source voltage to a load, such as relays are well known. When coupled with an electromechanical circuit breaker, a relay provides a remotely controllable power control function capable of supplying ac or dc service to load via its closed contacts in series with an electromechanical circuit breaker. Electromechanical switching devices, such as relays, provide a very low voltage drop at the switch closure thereby affording low power dissipation.

As used in ac power control applications, mechanical contacts cannot apply or remove power to a load free of bounce and arcing. Mechanical wear, electrical arcing and slow response also limit the application of electromechanical devices to applications requiring low closing cycle rates.

The SSPC is known to overcome the problem of contact bounce in applying a source voltage to a load. Solid state ac switches are also able to interrupt load current. However, SSPCs require low power dc voltage sources derived from the line service to operate their associated control and switch drive electronics. The electronic circuitry used within the SSPC is typically referenced to the ac power line voltage level and not to ground. Referencing the SSPC switch circuitry to the line voltage and not to ground or neutral permits all power to be removed from a serviced load as the SSPC switch is open. Control circuitry within tne SSPC remains active since the low voltage ac sources are referenced to the line voltage.

If the control circuitry within the SSPC is referenced to ground or neutral and the load is interposed between the ac line service and the switch, the load will be at line voltage as the SSPC switch is opened. Conventions of safety mitigate against this arrangement.

Typical prior art dc sources for use with SSPC's employ a power transformer and a rectifier and filter with the associated disadvantage of weight and size. As line voltage is increased, power transformers have the added disadvantage of requiring heavier insultion which adds to the size of the SSPC dc source. Efficient transformer design typically drives the geometry of the transformer to be cubic in character and not flat, which is the preferred geometry for circuit board construction.

SUMMARY OF THE INVENTION

It is an objective of this invention to provide an off line capacitor-divider power supply for solid state power controller that functions to provide several low voltage dc power levels referenced to the ac line voltage for use by the control and drive electronics in an ac SSPC.

It is another objective of this invention to implement an off line capacitor-divider power supply for a solid state power controller to be powered from the ac line service. The invention circuit provides several dc power levels to the SSPC control and drive electronics without the use of a power transformer.

It is a further objective of this invention to use a relatively non-dissipative capacitive divider network with a rectifier and filter to augment the required dc sources. The dc voltage levels thus derived are independent of the SSPC switch load impedance or the ac switch state. The unregulated voltage sources thus provided is post regulated by a three-terminal voltage regulating means.

BRIEF DESCRIPTION OF THE DRAWINGS

The invention will be further described as to an illustrative embodiment in conjunction with the accompanying drawings in which.

DESCRIPTION OF THE PREFERRED EMBODIMENT

Figure 1:
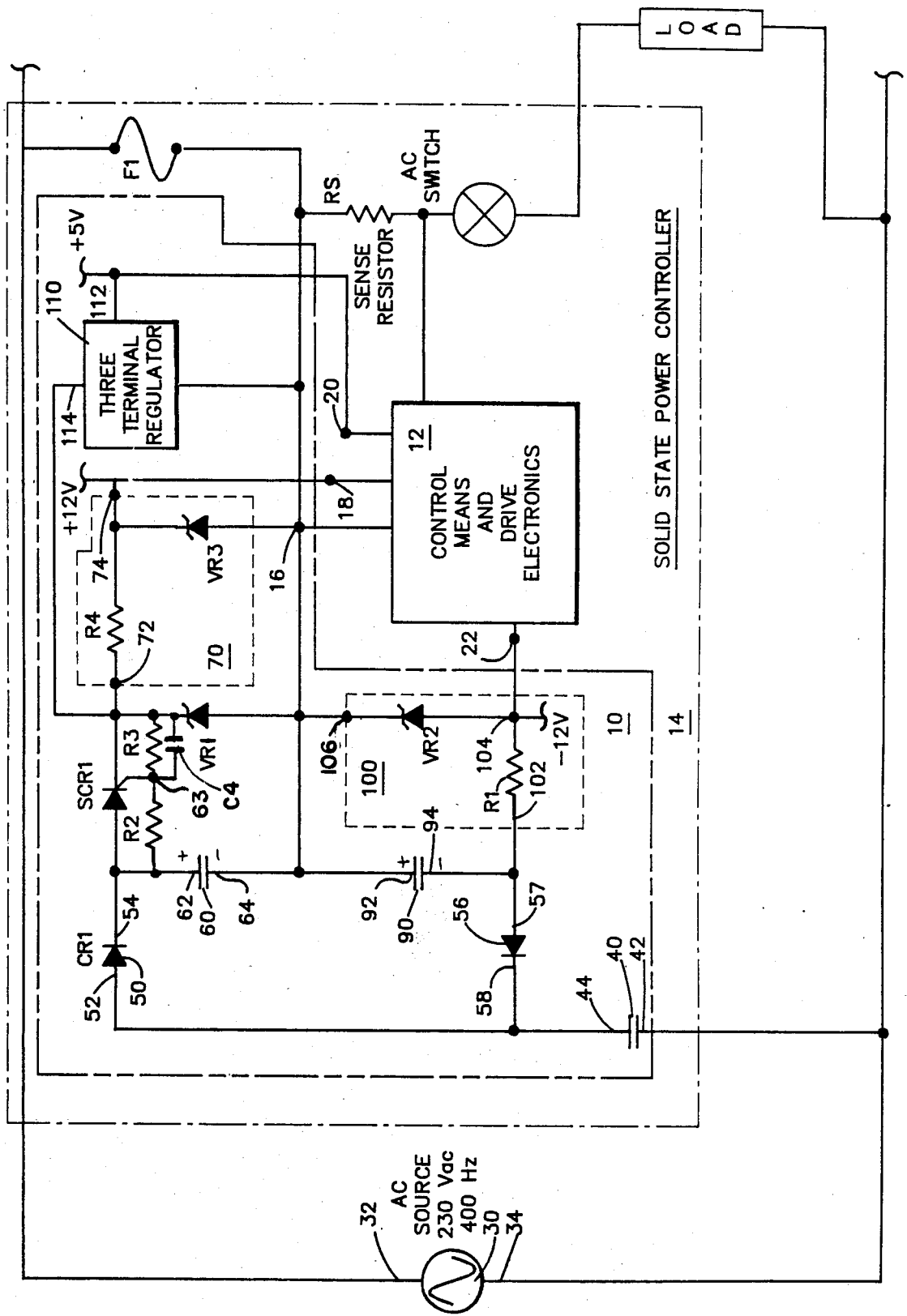
FIG. 1 is a schematic of the off line capacitor-divider power supply for a solid state power controller.

FIG. 1 shows the solid state power controller offline capacitor divider power supply 10. The invention capacitor divider power supply 10 operates with the CONTROL MEANS and DRIVE ELECTRONICS block circuits within the solid state power controller shown within phantom block 14. The CONTROL MEANS and DRIVE ELECTRONICS CIRCUITS block 12 has a reference terminal 16 connected to the ac power line via F1 and first and second positive input voltage terminals 18, 20 respectively. Block 12 also has a negative input voltage terminal 22.

The invention capacitor divider power supply is powered by an ac voltage source 30 having an output terminal 32 and a neutral terminal 34. The SSPC AC SWITCH switches power from AC SOURCE 30 via fuse F1, sense resistor RS to the LOAD connected between the AC SWITCH and neutral terminal 34.

Input capacitor 40 is shown having a first and second terminal 42, 44 respectively. The input capacitor first terminal 42 is connected to the ac voltage source neutral terminal 34.

A first diode 50 has an anode and a cathode 52, 54. The anode 52 is connected to the input capacitor second terminal 44.

A positive filter capacitor 60 is shown having a first and second terminal 62, 64 respectively. The first terminal 62 of the positive filter capacitor 60 is connected to the first diode cathode 54 and the positive filter capacitor second terminal 64 is connected to the control and drive circuit reference terminal 16. Phantom block 70 represents a first positive regulator means having an input terminal 72, an output terminal 74 and a reference terminal also connected to 16.

The first positive regulator provides a regulated voltage at its output terminal 74 in response to the application of an unregulated positive voltage source to its input terminal 72. The input terminal 72 is coupled to the first diode cathode 54 via SCR1. The output terminal 74 is coupled to the control and drive circuit first positive input voltage terminal 18. The reference terminal of the first positive regulator is common with the referenced terminal 16 of the control means and drive electronics 12.

The circuit has a second diode 56. This diode has an anode 57 and a cathode 58. The second diode anode 57 is coupled to the control and drive circuit reference terminal 16. In the embodiment of FIG. 1, the second diode anode 57 is coupled via zener diode 80 and negative filter capacitor 90 to reference terminal 16. The second diode cathode 58 is coupled to the input capacitor second terminal 44. The ac voltage source has an output terminal 32 coupled to the control and drive circuit reference terminal 16 via a path through fuse F1.

Figure 2:
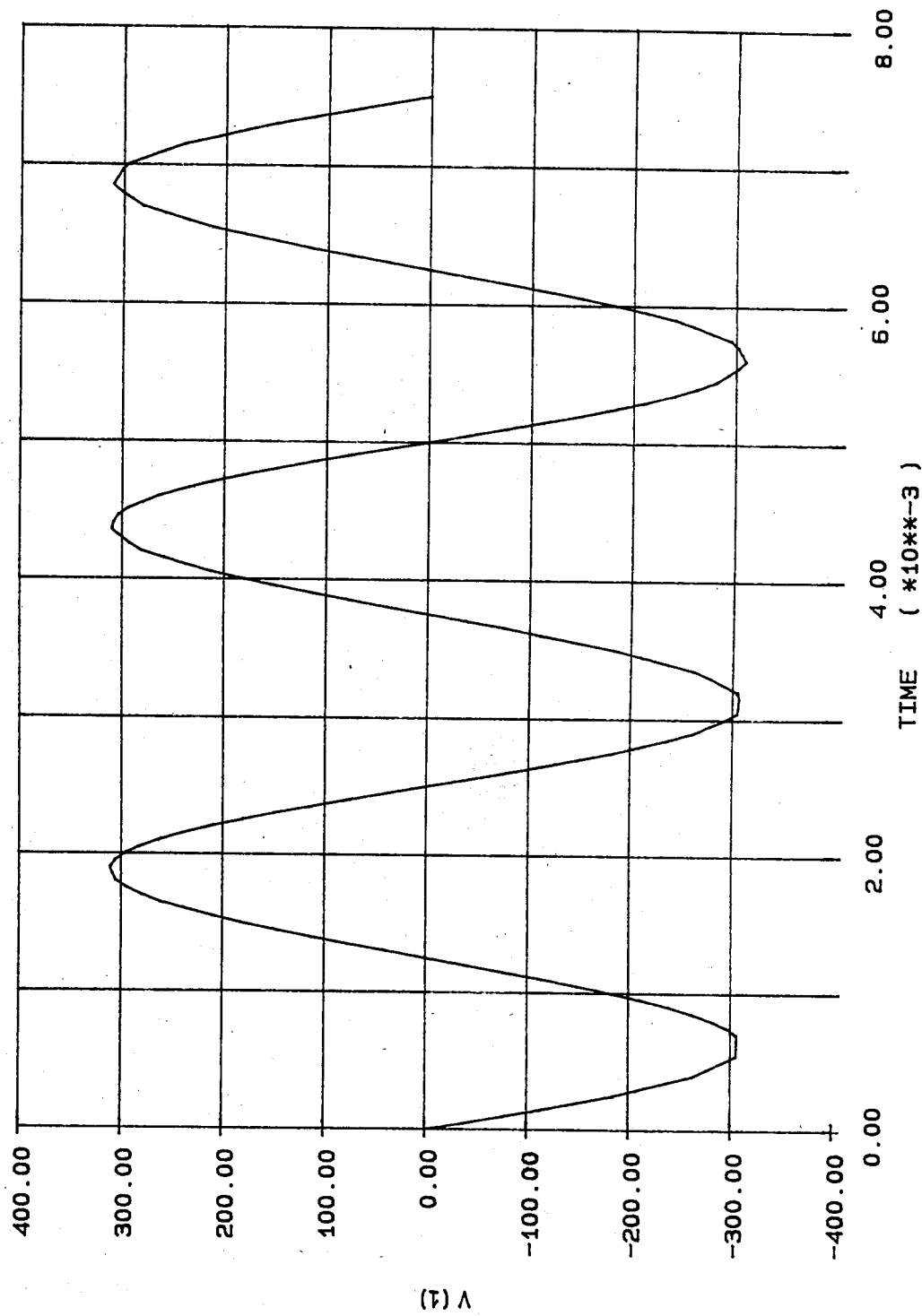
FIG. 2 is a voltage vs. time graph of a typical 230 VRMs, 400 Hz voltage source.

FIG. 2 is a graph of the ac voltage source 30. Voltage source 30 applies a periodic recurrent voltage to the input capacitor 40 with respect to the control and drive circuit reference terminal 16.

Figure 3:
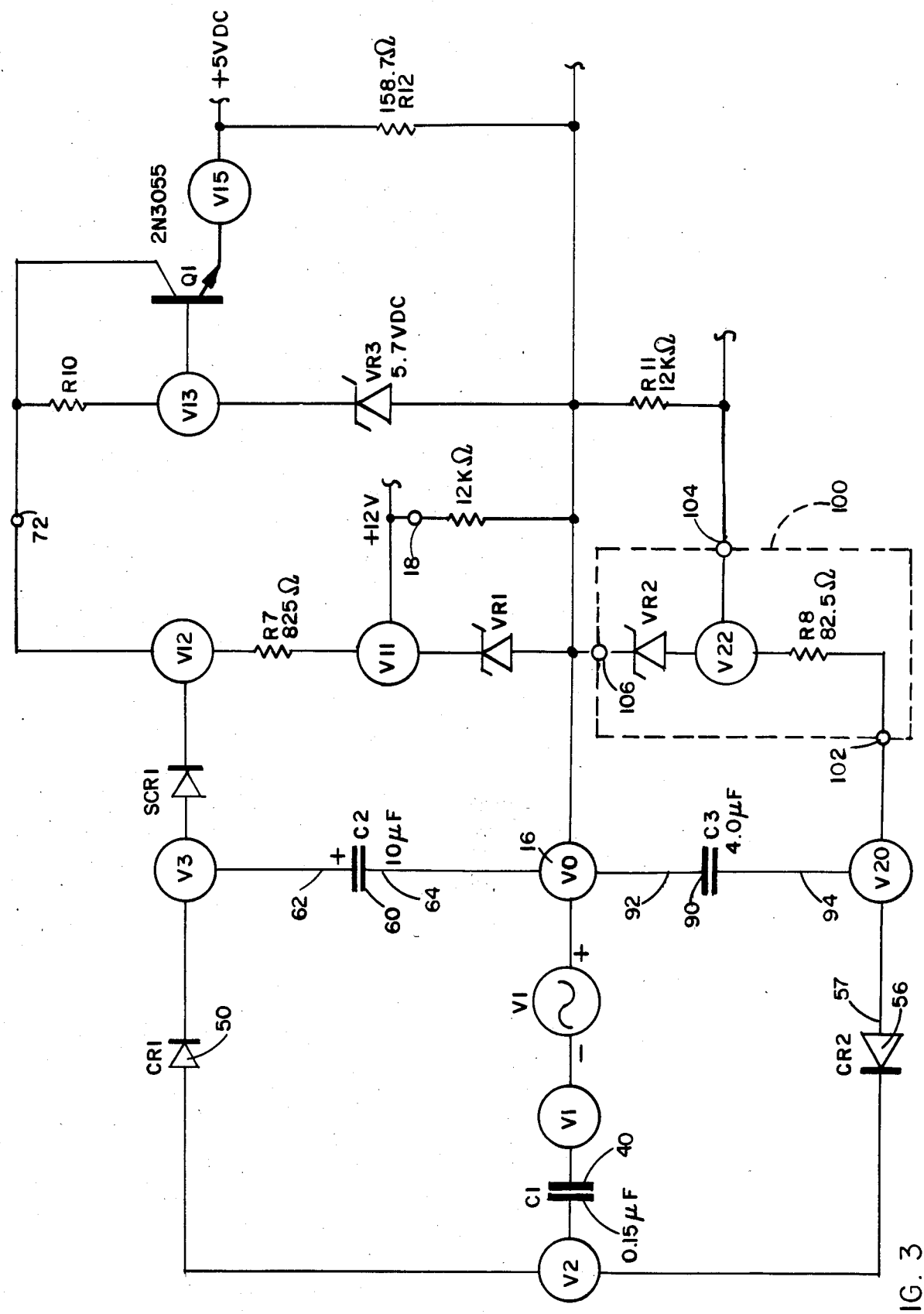
FIG. 3 is a schematic of the invention circuit of FIG. 1, simplified for analysis.

FIG. 3 is a simplified version of the schematic of FIG. 1. Operation of the circuit of FIG. 1 will be explained later using the simplified schematic of FIG. 3 and the voltage vs. time graphs of FIGS. 4, 5, and 6. These graphs show how the voltages at the circled nodes of FIG. 3 develop in response to the initial application of ac voltage source V1 at node V1. Node VO corresponds to reference node 16 of FIG. 1. The diodes and capacitors of FIG. 3 are labeled to correspond with the circuit of FIG. 1.

The input capacitor C1, 40 couples a positive predetermined portion of each cycle of the ac voltage via the first diode CR1, 50 to the positive filter capacitor C2, 60 first terminal 62. The positive filter capacitor stores the positive predetermined portion of each cycle of the ac voltage for application to the regulator means input terminal 72 at node V12. The regulator means is responsive to the positive predetermined portion of the ac voltage at V1 with respect to the voltage reference node 16 for applying a regulated dc voltage to the control and drive circuit input voltage terminal 18. Resistor R9 simulates the load presented by the SSPC control and drive electronics on terminal 18.

Referring again to FIG. 1, negative filter capacitor 90 is shown having a first and second terminal 92, 94 respectively. The first terminal is coupled to the control ano drive circuit reference terminal 16 and the second terminal is coupled to the second diode anode 57. A negative regulator means is shown within phantom block 100 having an input terminal 102, an output terminal 104, and a reference terminal 106.

The negative regulator provides a negative regulated voltage at its output terminal 104 with respect to its reference terminal 106 in response to the application of a negative unregulated voltage source to its input terminal 102. The input terminal 102 is coupled to the second diode anode 57. The output terminal 104 is coupled to the control and drive circuit negative input voltage terminal 22. The reference terminal 106 is coupled to the control and drive circuit reference terminal 16. Although a conventional zener regulator is shown for purposes of illustration, it is understood that three terminal linear regulators can be used.

Referring again to FIG. 3, as the ac voltage source V1 applies a periodic recurrent voltage to the input capacitor 40 witn respect to the control and drive circuit reference terminal 16, at VO input capacitor C1 couples a negative predetermined portion of each cycle of the ac voltage via the second diode CR2 56 to the negative filter capacitor C3, 90. The negative filter capacitor C3 stores the voltage and applies the predetermined portion of the voltage to the negative regulator means input terminal 102.

Referring to FIG. 1, SCR1 represents a threshold-sensitive voltage switch having a conduction channel having a positive and negative terminal corresponding to its anode and cathode connected to the cathode of CR1, 54 and to the positive input voltage terminal 72, respectively, and a gate coupled to node 63. A voltage divider comprising R2 and R3 has a common junction at node 63.

The first terminal of R2 is coupled to node 62 and the second terminal of R3 is coupled to node 72. Zener regulator VR1 operates as a voltage clamp and is normally not driven into conduction. VR1 is used to protect the three terminal +5 V regulator 110 input terminal 114 from exceeding the absolute maximum rating of that component.

The values of the first and second divider resistors are selected to produce a voltage at the junction, i.e. the gate of SCR1, that is sufficient to trigger the threshold sensitive voltage switch, i.e. SCR1 into conduction in response to the positive unregulated voltage level at the first terminal of the positive filter capacitor 62 exceeding a predetermined threshold, typically 40 V. The function of the SCR1 threshold-sensitive voltage switch is to ensure an abrupt and bounce-free application of regulated power to the control means and drive electronic circuits 12 via the positive input voltage terminal 18.

Under startup conditions, SCR1 would be non-conductive until the voltage divider R2, R3 developed a sufficient positive potential at the gate of SCR1 to fire SCR1. Once fired, SCR1 couples the first terminal of the positive filter capacitor 62 to the positive input terminal 72 of positive regulator means 70. SCR1 remains in conduction until the voltage on the first terminal of the positive filter capacitor 62 with respect to reference node 16 drops to a level insufficient to maintain SCR1 in conduction.

To facilitate the explanation of the voltage divider circuit, silicon-controlled rectifier SCR1 is replaced by a diode in FIG. 3 between voltage nodes V3 and B12. The abrupt rise of voltage at the input of the positive regulator means 72 will therefore not be illustrated by the graphs of FIGS. 4, 5, and 6. Waveform (a) represents the voltage waveform at node V12. Waveform (b) represents the voltage at node 13 at the base of regulator transistor Q1. Components R12, VR3 and Q1 represent an alternative embodiment of a three-terminal regulator augmented to provide a regulated +5 V output at node V15. The node voltage at V12 is applied to the collector of the Q1 transistor and to R12 to provide bias current to the base of Q1. Waveform (c) represents the voltage at node 15, the output of the three-terminal 5 V regulator. The circuit of FIG. 3 is initially unpowered.

Figure 4:
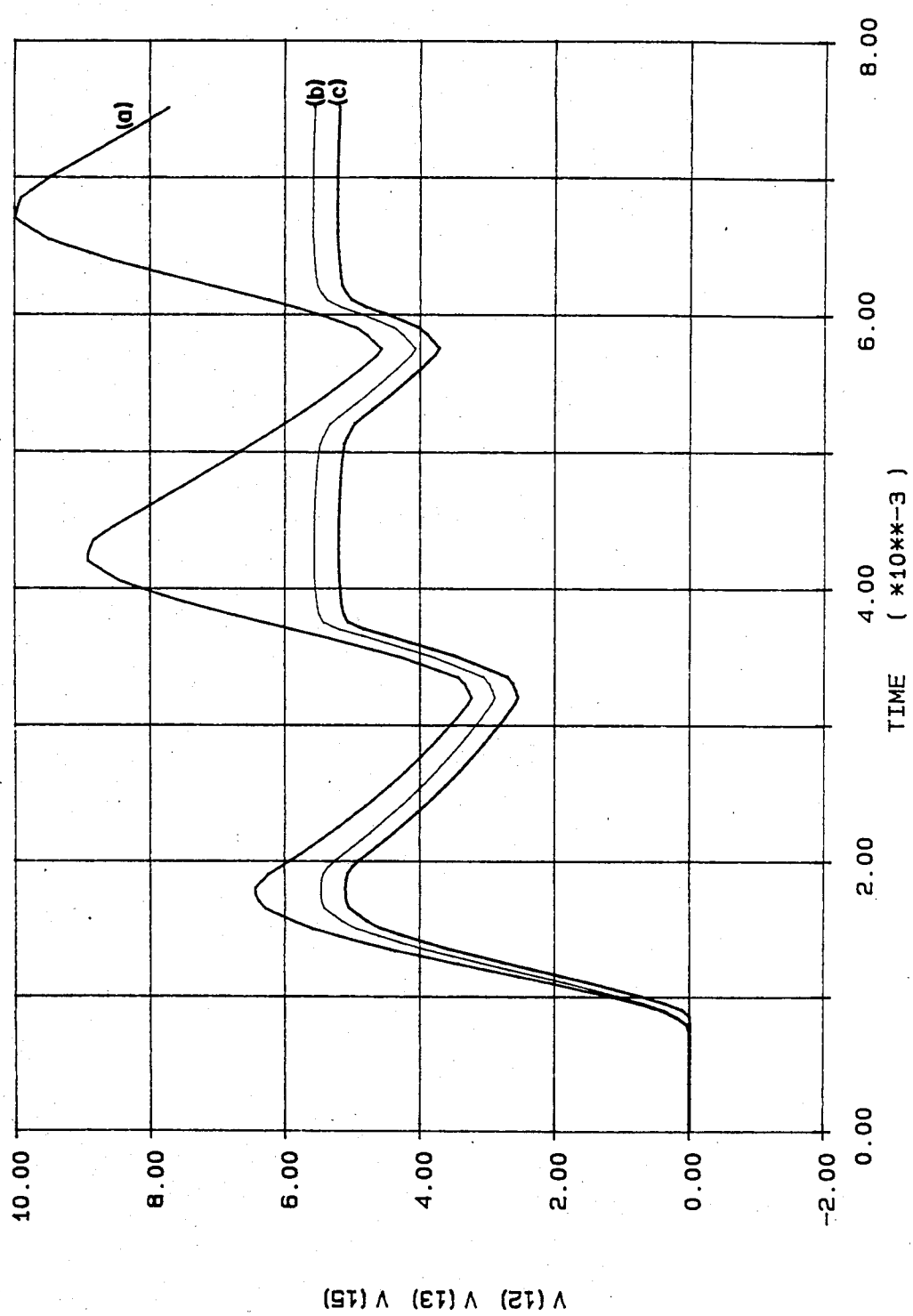
FIG. 4 is a voltage vs. time graph of the start-up voltages at circled V(12) V(13) V(15) for the circuit of FIG. 3 when driven by source V(1) having an output voltage as characterized by FIG. 2.
Figure 5:
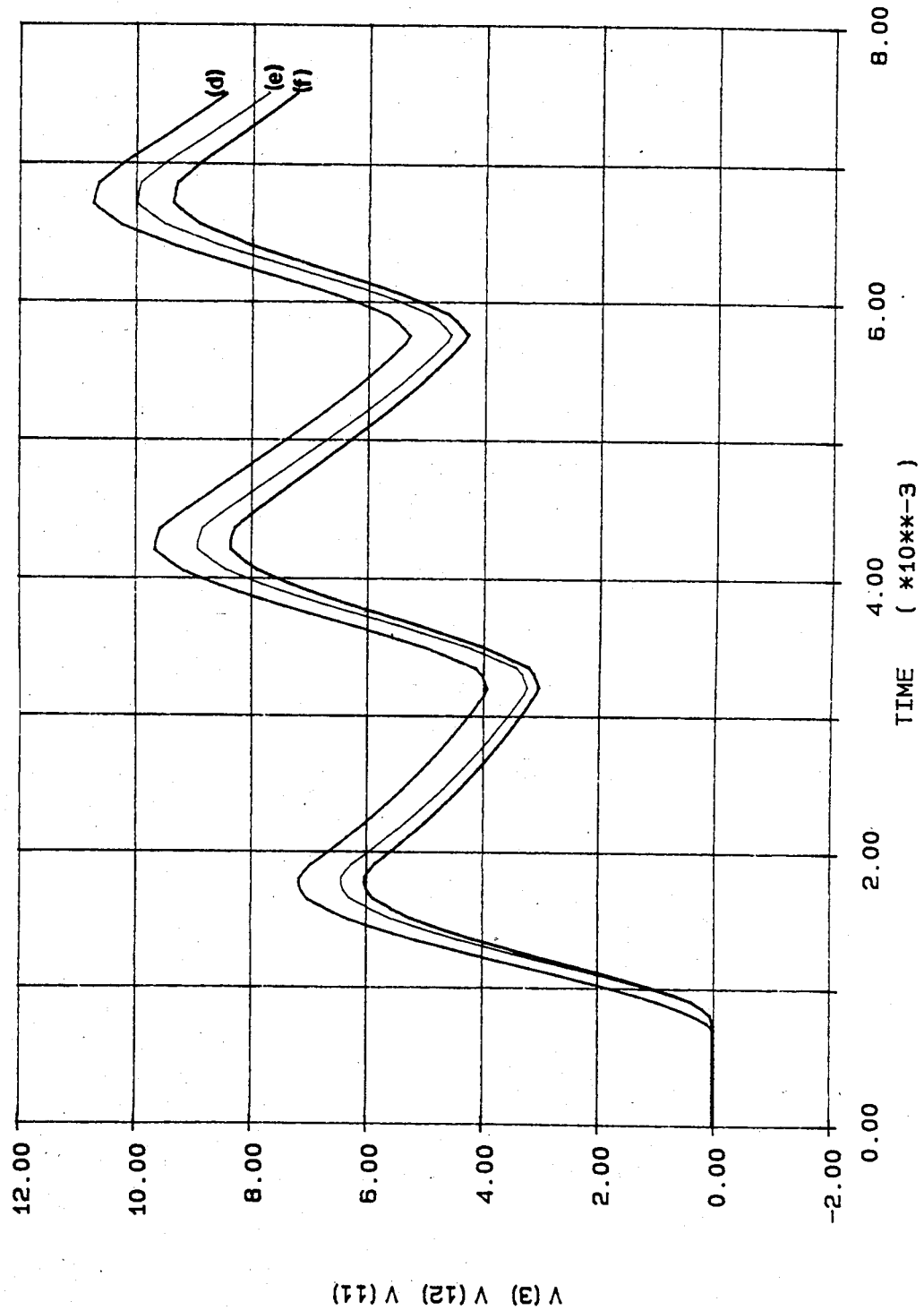
FIG. 5 is a voltage vs. time graph of the start-up voltages at nodes V(3) V(12) and V(11).
Figure 6:
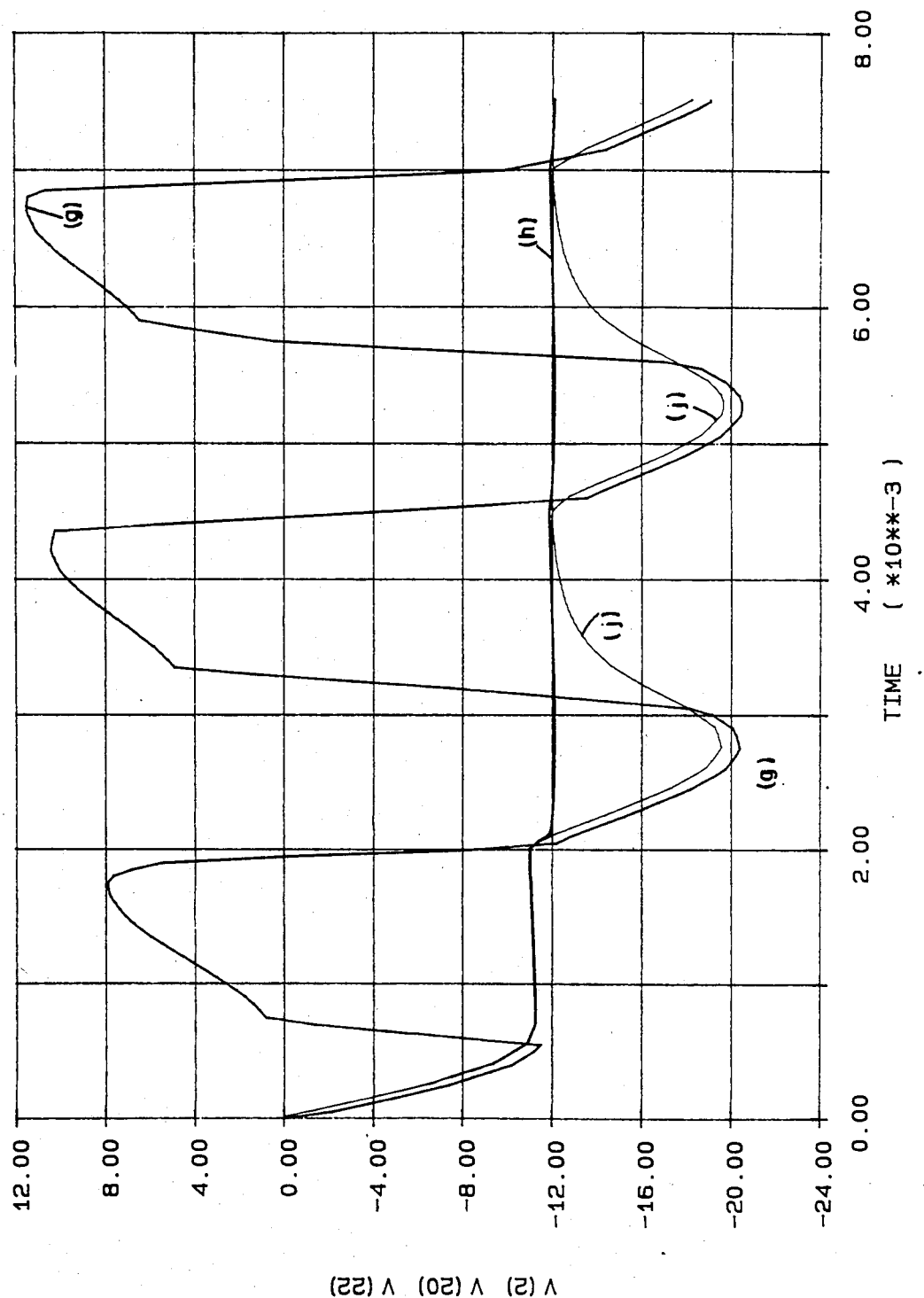
FIG. 6 is a voltage vs. time graph of the start-up voltages at nodes V(2) V(20) and V(22).

Application of voltage from ac source V1 via input capacitor C1 starts at time =zero (TO) in FIGS. 4, 5 and 6. Each cycle of applied voltage requires 2.5 milliseconds. The voltage waveforms of FIGS. 4, 5 and 6 represent the response characteristics of the circuit to approximately three cycles of voltage from source V1 and ending approximately 7.5 milliseconds after TO.

Referring to FIG. 2, it can be seen that the applied voltage reaches a positive peak value at node 1 with respect to node 0 at a time slightly less than 2.0 milliseconds after TO. FIG. 4 reflects this positive rise with waveforms that correspond in time to the source applied to node V1. The waveforms of FIG. 4 follow a negative slope slightly after 2.0 milliseconds as a result of the negative swing of the source V1. The slope is controlled by the value of the C2 capacitor and the current demand of the two positive regulators via the SCR1 diode. Node voltage V13 is observed to remain slightly more positive than the node voltage at V15 as a result of the forward biased base to emitter junction of Q1. As the time extends to slightly before 4.0 milliseconds, waveforms (b) and (c) both begin to manifest a clamping property not manifested by the waveform (a) voltage. Clamping begins as waveform (b) exceeds the 5.7 V threshold of VR3. VR3 operates to clamp the voltage at node V13 at 5.7 V. The voltage at V15 must remain one junction drop below the voltage at V13 to maintain a slightly forward biased base-to-emitter junction for Q1.

FIG. 5 shows the voltage relationships between nodes V3, V12, and V11. Waveform (d) represents the voltage at node 3. waveform (e) represents the voltage at node V12, and waveform (f) represents the voltage at node V11. An insufficient number of power cycles are available to permit the voltage at node V11 to rise to +12 V, the threshold of zener regulator VR1. As a result, clamping of the voltage at node V11 is not observed. Additional power cycles would be required to raise the voltage at node V11 to a point where a regulated +12 V output could be obtained at node V11, i.e. node 18 in FIG. 1. Waveform (d) is observed to remain slightly more positive than waveform (e) because diode SCR1 remains forward biased throughout the time interval of interest.

FIG. 6 characterizes the voltage at node V2 in relation to the voltages at nodes V20 and V22 to explain the operation of the negative unregulated and negative regulated voltage sources. FIG. 2 shows that the source voltage V1 swings initially negative during the interval preceding 0.5 milliseconds. As the node voltage at V1 swings negative, capacitor C1 couples a predetermined portion of the negative swing of source V1 to node V2. The negative voltage swing at node V2 is shown by waveform (g) in FIG. 6.

The abrupt reversal in voltage change of the voltage at node V2 results from the fact that the second diode CR2 becomes back-biased as the source V1 swings from a negative polarity to a positive polarity. The node voltage at node 20 is shown by waveform (n). This waveform is observed to reach a level approaching −12 V before 2.0 milliseconds have elapsed. On subsequent cycles, waveform (h) shows the voltage at waveform (20) clamped to a −12 V level, the design level for the negative voltage regulator. Regulation is achieved rapidly because the −12 V regulator is only lightly evaded (12K).

Waveform (j) represents the voltage at node V22. This voltage is observed to always remain slightly more positive than the voltage at node V2 represented by waveform (g).

The component values selected for the analysis influence the rates at which regulation is achieved at the outputs of the positive and negative voltage regulator circuits. The negative regulator appears to achieve regulation within one power cycle from application of the applied source, V1. Referring to FIG. 4, the positive 5V regulator is entering its regulation range by the eno of the third power cycle. FIG. 5 suggests that the positive 12V regulator will require additional power cycles before regulation is achieved. An increase in the value of load resistor R12 shown in FIG. 3 will result in the positive 12V regulator means achieving regulation at an earlier point in time.

FIGS. 4 and 5 show that without the unique feature provided by the threshold sensitive switch, i.e. SCR1 and the associated voltage divider for providing a firing signal to its gate, an interval of time is required before the regulated dc levels are within regulation, i.e. within a 10% band. SCR1 operates to provide a hold-off feature. No regulated positive dc voltage levels are provided to the control means and drive electronics 12 until C2, 60 charges to a firing limit, i.e. 40 Vdc. At that point SCR1 fires and the positive regulated dc levels at V15 and at V11, i.e. terminals 18, 20 respectively rise abruptly to the design regulated levels and do not drop below the regulation limits. This feature is necessary where the circuitry being powered includes microprocessor based elements which typically require a sharp and clean application of positive dc voltage.

The present circuit does not provide a sharp turn-on feature for the negative dc voltage level from C3 via VR2. Referring to FIG. 3, it is apparent that a second SCR could be interposed between node V20 and node 102 with its cathode coupled to node V20 and with a voltage divider circuit similar to the R2, R3 divider of FIG. 1 coupled to fire the second SCR as the negative voltage on C3 penetrates a predetermined negative level. As an alternative, the second SCR can be fired via a firing circuit (not shown) responsive to the firing of the first SCR.

We claim:
1. A solid state power controller off line capacitor divider power supply coupled to an ac voltage source having san output terminal and a neutral terminal,
for supplying regulated dc voltage levels referenced to said ac voltage source output terminal such as the control and drive circuits of a solid state power controller, said control and drive circuits having a reference terminal coupled to said ac voltage source output terminal, and at least, a first positive input voltage terminal, said solid state power controller off line capacitor divider power supply comprising:

an input having a first and second terminal; said capacitor first terminal being coupled to said ac voltage source neutral terminal, a first diode having an anode and a cathode; said anode being coupled to said capacitor second terminal, a positive filter capacitor having a first and second terminal; said first terminal being coupled to said first diode cathode and said filter capacitor second terminal being coupled to said control and drive circuit reference terminal, at least a first positive regulator means having an input terminal, an output terminal and a reference terminal for providing a regulated voltage at its output terminal in response to the application of an unregulated positive voltage source to its input terminal; said input terminal being coupled to said first diode cathode, said output terminal being coupled to said control and drive circuit first positive input voltage terminal and said reference terminal being coupled to said control and drive circuit reference terminal, a second diode having an anode and a cathode, said second diode anode being coupled to said control and drive circuit reference terminal and said second diode cathode being coupled to said input capacitor second terminal, and whereby, said ac voltage source applies a periodic recurrent voltage to said input capacitor with respect to said control and drive circuit reference terminal, said input capacitor coupling a positive predetermined portion of each cycle of said ac voltage via said first diode to said positive filter capacitor first terminal, said filter capacitor storing said positive predetermined portion voltage as an unregulated postive voltage and applying said positive unregulated positive voltage to said regulator means input terminal, said regulator means being responsive to said unregulated positive voltage for applying a regulated positive voltage to said control and drive circuit input voltage terminal.

2. The solid state power controller off line capacitor divider power supply of claim 1
for operation with the control and drive circuits of a solid state power controller, said control and drive circuits having a negative input voltage terminal; said solid state power controller off line capacitor divider power supply comprising:

a negative filter capacitor having a first and second terminal; said first terminal being coupled to said control and drive circuit reference terminal and said second terminal being coupled to said second diode anode; and a negative regulator means having an input terminal, an output terminal and a reference terminal for providing a negative regulated voltage at its output terminal in response to the application or a negative unregulated voltage source to its input terminal; said input terminal being coupled to said second diode anode; said output terminal being coupled to said control and drive circuit negative input voltage terminal and said reference terminal being coupled to said control and drive circuit reference terminal, whereby, said ac voltage source applies a periodic recurrent voltage to said input capacitor with respect to said control and drive circuit reference terminal, said capacitor coupling a negative predetermined portion of each cycle of said ac voltage via said second diode to said negative filter capacitor first terminal, said negative filter capacitor storing said negative unregulated voltage and applying said negative unregulated voltage to said regulator means, said regulator means being responsive to said negative unregulated voltage for applying a regulated voltage to said control and drive circuit negative input voltage terminal.

3. The solid state power controller off line capacitor divider power supply of claim 1 for operation with the control and drive circuits of a solid state power controller, said control and drive circuits having a reference terminal and at least a positive input voltage terminal; said solid state power controller off line capacitor divider power supply further comprising:

a threshold sensitive voltage switch having a conduction channel having a positive and negative terminal and a control terminal, said conduction channel being interposed between said positive filter capacitor first terminal and said positive regulator input terminal a voltage divider having a first and second resistor coupled at a common junction, said common junction being connected to said control terminal; said divider being connected between said threshold sensitive voltage switch conduction channel positive and negative terminal; the values of said first and second divider resistors being selected to produce a voltage at said junction sufficient to trigger said threshold sensitive voltage switch into conduction in response to said positive unregulated voltage level exceeding a predetermined threshold voltage level.

4. A solid state power controller off line capacitor divider power supply coupled to an ac voltage source, said ac voltage source having an output terminal and a neutral terminal, said divider supply being characterized to supply regulated dc voltage levels referenced to said ac voltage source output terminal to a line referenced load such as the control and drive circuits of a solid state power controller, said control and drive circuits having a reference terminal coupled to said ac voltage source output terminal, and at least, a first positive input voltage terminal, said solid state power controller off line capacitor divider power supply comprising:

an input capacitor having a first and second terminal; said input capacitor first terminal being coupled to said ac voltage source neutral terminal, a first diode having an anode and a cathode; said anode being coupled to said input capacitor second terminal, a positive filter capacitor having a first and second terminal; said first terminal being coupled to said first diode cathode and said filter capacitor second terminal being coupled to said control and drive circuit reference terminal, a positive regulator means having an input terminal, an output terminal and a reference terminal for providing a positive regulated voltage at its output terminal in response to the application or an unregulated positive voltage source to its input terminal, said input terminal being coupled to said positive filter capacitor first terminal, said output terminal being coupled to said control and drive circuit first positive input voltage terminal and said reference terminal being coupled to said control and drive circuit reference terminal, a second diode having an anode and a cathode, said second diode anode being coupled to said control and drive circuit reference terminal and said second diode cathode being coupled to said input capacitor second terminal, and an SCR having an anode, a cathode and a gate; and a divider having a first and second resistor, each resistor having a first and second terminal; said SCR anode being coupled to said first resistor first terminal and to said positive filter capacitor first terminal, said divider first resistor second terminal being coupled to said second resistor first terminal and to said SCR gate, said second resistor second terminal being coupled to said SCR cathode and to said positive regulator input terminal, the values of said first and second resistors being selected to fire said SCR in response to the voltage on positive filter capacitor first terminal with respect to the control and drive circuit reference terminal exceeding a predetermined limit;

whereby, said ac voltage source applies a periodic recurrent voltage to said input capacitor with respect to said control and drive circuit reference terminal, said input capacitor coupling a positive predetermined portion of each cycle of said ac voltage via said first diode to said positive filter capacitor first terminal, said filter capacitor storing said positive predetermined portion voltage as an unregulated positive voltage and applying said positive unregulated positive voltage to said regulator means input terminal, said regulator means being responsive to said unregulated positive voltage for applying a regulated positive voltage to said control and drive circuit input voltage terminal.

* * * * *

UNITED STATES PATENT AND TRADEMARK OFFICE
CERTIFICATE OF CORRECTION

PATENT NO. : 4,665,355

DATED : May 12, 1987

INVENTOR(S) : Patrick E. McCollum et al.

It is certified that error appears in the above-identified patent and that said Letters Patent is hereby corrected as shown below:

In Abstract, cover page, line 2, "coupler" should read -- coupled --.

Column 2, line 7, "insultion" should read -- insulation --.

Column 4, line 7, "ano" should read -- and --.

Column 5, lines 49-58, "VII" (V-eleven) was misprinted as "VII" (V-one-el) seven times.

Column 6, line 27, "eno" should read -- end --.

Column 6, line 64, "san" should read -- an --.

Column 7, line 6, after "input" insert -- capacitor --.

Column 7, line 63, "or" should read -- of --.

Column 8, line 34, "terminal;" should read -- terminals; --.

Column 8, line 68, "or" should read -- of --.

Signed and Sealed this

Twenty-fourth Day of November, 1987

Attest:

DONALD J. QUIGG

*Attesting Officer*  *Commissioner of Patents and Trademarks*